Figure 1:
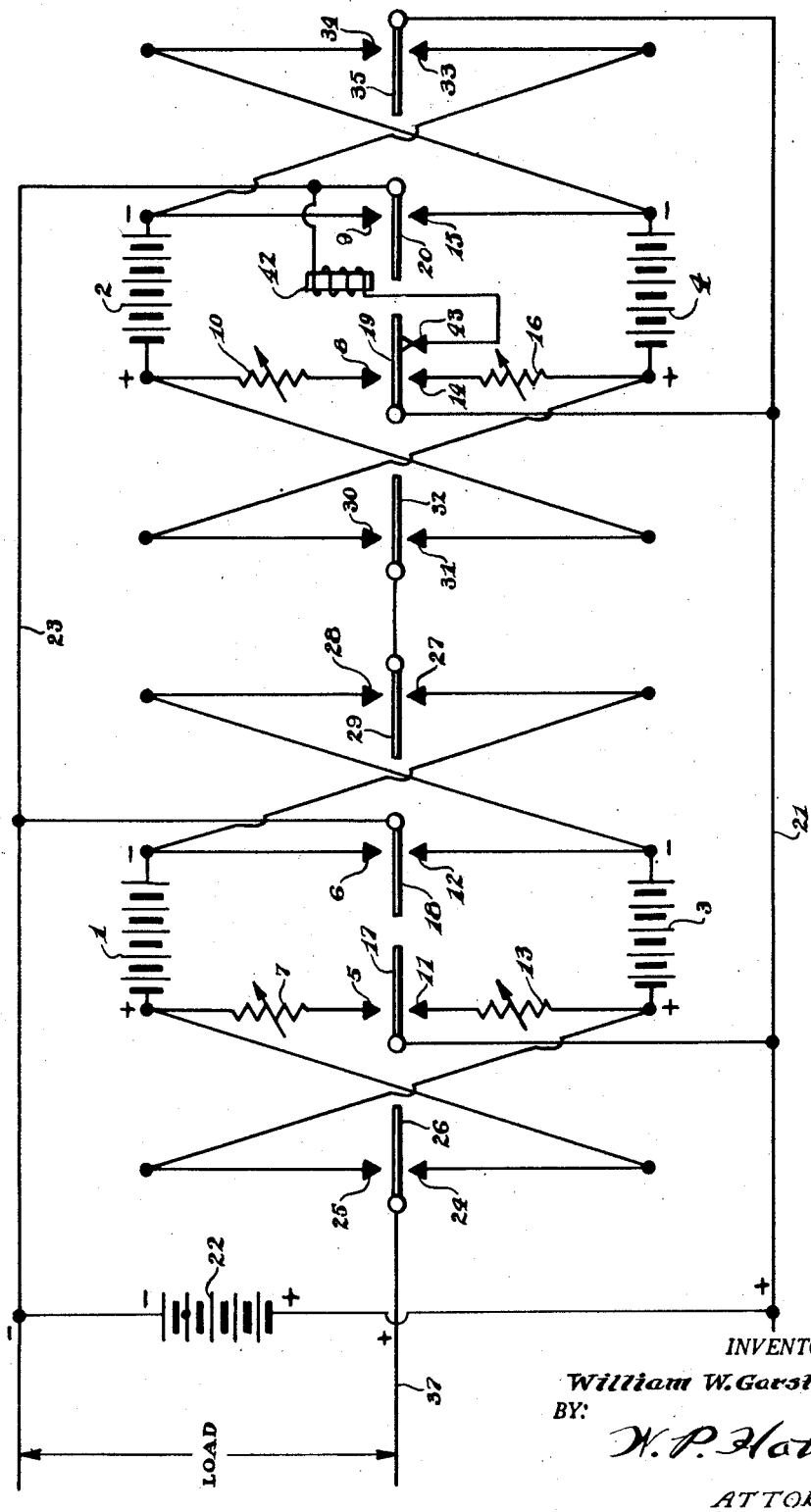

Sept. 18, 1945.   W. W. GARSTANG   2,384,831
VOLTAGE MULTIPLIER
Filed May 28, 1943   2 Sheets-Sheet 1

INVENTOR.
William W. Garstang,
BY: W. P. Hahn
ATTORNEY

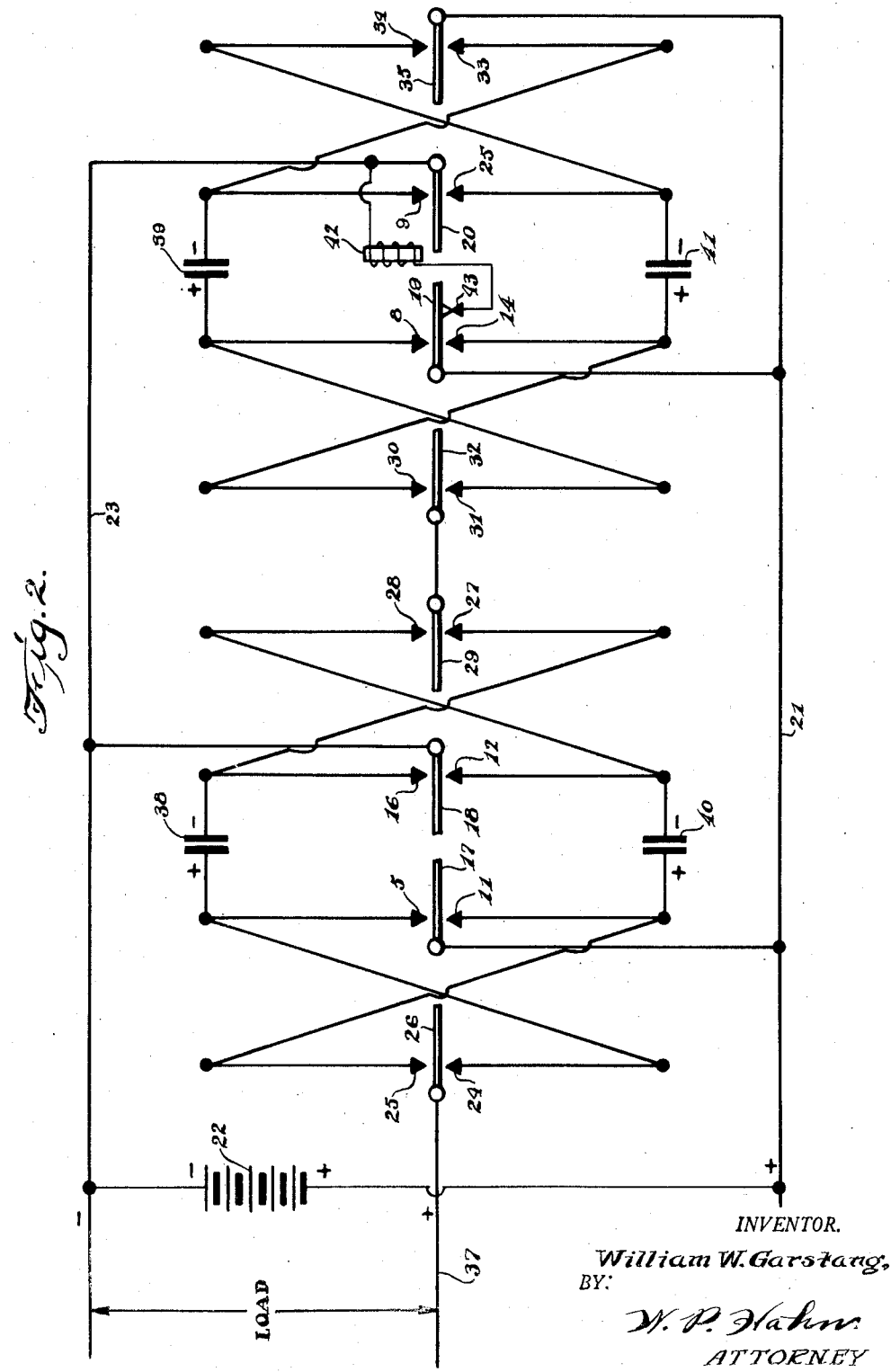

Patented Sept. 18, 1945

2,384,831

UNITED STATES PATENT OFFICE 2,384,831

VOLTAGE MULTIPLIER

William W. Garstang, Indianapolis, Ind., assignor to Electronic Laboratories, Incorporated, Indianapolis, Ind., a corporation of Indiana Application May 28, 1943, Serial No. 488,810

14 Claims. (Cl. 171—97)

The present invention relates to improvements in electrical systems and particularly to that type of electric system for the modification of the voltage delivered from the source of power to the load.

One of the objects of the invention is that of providing an electrical system primarily adapted for modifying the voltage delivered from such a source of power as a battery wherein a plurality of energy storing units are adapted to be, at one period during the operation, connected with the battery in parallel, so that the units may individually receive an energy from the source of supply and, during another period, be connected in series with the load, the series connection to include the source of supply.

Another object of my invention is to provide a system having the above characteristics whereby a full wave delivery is provided for the load.

A still further object of my invention is to provide a system having the above characteristics wherein the system includes a common ground or a common lead preferably on the negative side.

Other objects and advantages of my invention will be more fully apparent in the accompanying specification and claims.

For the purpose of disclosing my invention, I have illustrated certain embodiments thereof in the accompanying drawings, in which:

Fig. 1 is a diagrammatic view of the circuit arrangement embodying my invention; and Fig. 2 is a diagrammatic view of another arrangement wherein a different type of storage unit is employed in the circuit.

In the embodiment illustrated in Fig. 1, I provide a plurality of groups of storage units, in the present instance consisting of storage batteries. Each of these groups consists of a plurality of batteries, in the present instance two. Thus group 1 consists of the batteries 1 and 2 and group 2 consists of the batteries 3 and 4. Battery 1 is connected between a pair of stationary contacts 5 and 6 of suitable vibrator interrupter and in the circuit of this battery, between the contact 5 and the battery, I provide a resistance 7.

The battery 2 is likewise connected between a pair of stationary contacts 8 and 9 of a vibrating switch and likewise has connected in its circuit a resistance 10.

Similarly, battery 3 is connected between a pair of contacts 11 and 12 oppositely disposed relatively to the contacts 5 and 6. This battery likewise has connected in its circuit a resistance 13. The battery 4 is connected between a pair of stationary contacts 14 and 15 oppositely disposed relatively to the contacts 8 and 9 and a resistance 16 is connected in its circuit.

A pair of vibrating contacts 17 and 18, preferably comprising a pair of vibrating reeds carrying suitable contacts, operate respectively between contacts 5 and 11 and contacts 6 and 12. A similar pair of contacts 19 and 20 operate respectively between contacts 8 and 14 and contacts 9 and 15.

The contacts 17 and 19 are respectively connected to a lead 21 connected to one side of a source of supply in the form of a battery 22 and contacts 18 and 20 are respectively connected to a lead 23 in turn connected to the opposite side of the battery 22.

In addition to the above vibrating switches or interrupters, one side of the battery 1 is connected to a stationary contact 24 which, it will be noted, is disposed in opposite relation to the contact 5 and one side of the battery 3 is connected to a stationary contact 25 which stationary contact, it will be noted, is in opposite relation, having reference to the vibrating contacts, to the contact 11. The vibrating contact 26 operates between these two stationary contacts 24 and 25. Similarly, the opposite side of the battery 1 is connected to a contact 27, while the opposite side of the battery 3 is connected to a contact 28 between which operates a vibrating contact 29. The battery 2 is connected on one side with a stationary contact 30 oppositely disposed with respect to contact 8 and battery 4 is connected to one side to a contact 31 oppositely disposed with respect to contact 14, and between these contacts a vibrating contact 32 operates. A similar connection is provided on the opposite side of the batteries 2 and 4, the battery 2 being connected to a contact 33 and battery 4 being connected to a contact 34 with a vibrating contact 35 operating therebetween. The contact 26 is connected to a lead 37 between which and the lead 23 a load is adapted to be connected. Contacts 29 and 32 are connected together and the contact 35 is connected to the lead 21.

For illustrative purposes, we will assume that it is desired to deliver to the load 28 volts. Under these circumstances, the source of supply battery 22 will have a capacity of twelve volts. Each of the batteries 1, 2, 3 and 4 will have a capacity of ten volts. Assuming that the contacts have been moved under the influence of the magnet 36 to the "up" position, looking at Fig. 1, then batteries 1 and 2 will be connected in parallel between the leads 21 and 23, thus in a relation to receive separately a charge from the battery 22. At the same time, batteries 3 and 4 will be connected between leads 21 and 37, in series, thus connecting batteries 22, 3 and 4 in series with the load, delivering a total of thirty-two volts. However, due to the voltage loss in the system, a net voltage of twenty-eight volts will be delivered to the load. Likewise, when the vibrating contacts are in the "down" position, the batteries 3 and 4 will be connected in parallel in charge-receiving relation to the battery 22 and batteries 1 and 2 will be connected in series and discharging relation with bateries 22 and the load.

Due to the resistance in the battery circuits, the charge to the batteries 1 to 4, inclusive, will be limited, so that they will never be overcharged, irrespective of the conditions of battery 22. However, should the voltage of battery 12 drop below the twenty-two volts, additional charge will be delivered by the suplemental batteries, thereby maintaining the voltage constant and, in event the voltage of battery 2 becomes excessive, the resistance will, of course, prevent batteries 1 to 4, inclusive, from receiving more than their ten volt charge.

In Fig. 2, I have illustrated another form of my invention wherein in the place of electrical storage units in the form of storage batteries, I provide condensers or capacitors 38 and 39 in the place of batteries 1 and 2 and capacitors or condensers 40 and 41 in the place of batteries 3 and 4. In other respects, however, the circuit arrangement is the same and it is, therefore, apparent that in one position of the vibrating switches, the capacitors 38 and 39 will be connected in series with the battery 22 and thus discharge the multiplied voltage to the load and, at the same time, the capacitors or condensers 40 and 41 will be connected in parallel with the battery 22, thus being charged from the battery.

It is apparent that in both arrangements, however, a full wave current is delivered to the load because, while one set of storage units is being charged, the other set is discharging to the load and vice versa. It is further apparent that in the above system, I have provided a common negative lead which may be in the form of a lead or which may be in the form of a common ground.

In each of the structures shown in Figs. 1 and 2, the vibrating switches are driven by an electromagnet 42 having one terminal of the coil thereof connected to the lead 23 and the other terminal connected to a contact 43 cooperating with the contact on the reed 19 which, as heretofore explained, is connected with the lead 21.

I claim as my invention:

1. A voltage modifying system comprising, in combination, two pair of electrical energy storage units, means for alternately connecting said pairs of storage units in parallel with a source of supply, and means for alternately connecting said source of supply and one pair of said units in series with a load while the other pair is connected with the source of supply.

2. A voltage modifying system comprising, in combination, two sets of electrical energy storage units, each set including a plurality of units, means for alternately connecting the units of each set in parallel with a source of supply, and means for alternately connecting said source of supply and the units of each set in series with the load while the other set is connected with the source of supply.

3. A voltage modifying system comprising, in combination, two sets of electrical energy storage units, each set including a plurality of units, the units of the sets being disposed in paired relation, a pair of vibrating switches common to each pair of units for alternately connecting the units of each set in parallel with a source of supply and a pair of vibrating switches common to each pair of units for alternately connecting said source of supply and the units of each set in series with a load while the opposite set is connected to the source of supply.

4. A voltage modifying system comprising, in combination, a first plurality of groups of interrupting contacts, the contacts of each group comprising a pair of vibrating contacts, and two sets of contacts disposed on opposite sides of said vibrating contact, each set including two contacts, one for each movable contact, electrical storage units connected between the contacts of each set, the movable contacts of each pair being respectively connected to the opposite sides of a supply source, a second plurality of groups of interrupting contacts, each group including a pair of vibrating contacts and two sets of contacts disposed on opposite sides of said vibrating contacts, each set including two contacts, one for each vibrating contact, the pair of movable contacts being respectively connected to a supply line and a movable contact of another group and the contacts of a set being respectively connected to an energy storing unit.

5. A voltage modifying system comprising, in combination, a plurality of groups of interrupting contacts, each group including a first and second pair of vibrating contacts, a set of contacts disposed on each opposite side of said second pair of vibrating contacts, each set comprising two contacts, one for each of the vibrating contacts of said second pair, electric storage units connected between the contacts of each set, said vibrating contacts of said first pair being respectively connected to one side of a load and a vibrating contact of the next succeeding group, a vibrating contact of the first pair of the last group being connected to the other side of the load, two sets of contacts, one set disposed on each side of said first pair of vibrating contacts and each set comprising a pair of contacts, one for each of the first pair of contacts, said storage units being connected between the sets of contacts.

6. A voltage modifying system comprising, in combination, a pair of stationary contacts, an electrical storage unit connected between the same, a second pair of oppositely disposed stationary contacts, a second electrical storage unit connected between said second pair of contacts, a third pair of stationary contacts corresponding in disposition to said first pair of contacts, said second storage unit being connected between said third pair of contacts, a fourth pair of contacts corresponding in disposition to said second pair of contacts, said first storage unit being connected between said fourth pair of contacts, a vibrating contact operating between two contacts of said first and second pair and connecting to one side of a supply source, a second vibrating contact operating between the other two contacts of said first and second pair and connected to the opposite side of a supply source, a third vibrating contact operating between two contacts of said third and fourth pair of contacts and connected to one side of a load and a fourth vibrating contact operated between the other two contacts of said third and fourth pair and adapted for connection with the other side of said load through said source of supply.

7. A voltage modifying system comprising, in combination, two groups of energy storing units, each group composing a plurality of units, the units of each group being connected to two pair of contacts, the contacts of one pair being oppositely disposed relatively to the other pair and the pairs of contacts of the units of the two groups being oppositely disposed, vibrating contacts operating between the opposed contacts of the groups and adapted by their movement between the opposed contacts to alternately connect the energy storage units of one group in parallel with a source of supply and the energy storage units of the other groups with the load in series with the source of supply and one another.

8. A voltage modifying system comprising, in combination, a supply storage battery, two groups of energy storage batteries, each group comprising a plurality of energy storage batteries, the units of each group being connected to two pairs of contacts, the contacts of one pair being oppositely disposed relatively to the other pair and the pairs of contacts of the two groups being oppositely disposed, vibrating contacts operating between the opposed contacts of the groups and adapted by their movement between the opposed contacts to alternately connect the energy storage batteries of one group in parallel with a supply battery and the batteries of the other group with the load in series with one another and with the supply battery.

9. A voltage modifying system comprising, in combination, a supply storage battery, two groups of energy storage batteries, each group comprising a plurality of batteries, the batteries of each group being connected to two pairs of contacts, the contacts of one pair being oppositely disposed relatively to the other pair, a limiting resistance in the circuit of each of the energy storage batteries, the pairs of contacts of the energy storage batteries of the two groups being oppositely disposed, vibrating contacts operating between the opposed contacts of the groups and adapted by their movement between the opposed contacts to alternately connect the energy storage batteries of one group in parallel with the supply battery with a limiting resistance in the circuit of each of the energy storage batteries and the units, and the batteries of the other groups to the load in series with one another and in series with the source of supply battery.

10. A voltage modifying system comprising, in combination, a pair of leads, a source of supply connected between said leads, a third lead, one of said pair of leads and said third lead being adapted for connection with a load, two groups of electrical storage energy units, each group including a plurality of units, means for alternately connecting the units of one group in parallel between said pair of leads and simultaneously connecting the units of the opposite group in series between one of said pair of leads and said third lead.

11. A voltage modifying system comprising, in combination, a pair of leads, a storage battery connected between said leads, a third lead, one of said pair of leads and said third lead being adapted for connection with a load, two groups of storage batteries, each group including a plurality of storage batteries of smaller voltage capacity than said first-mentioned battery, and means for alternately connecting the batteries of one group in parallel between said pair of leads and simultaneously connecting the batteries of the other group in series between said third lead and one of said pair of leads.

12. A voltage modifying system comprising, in combination, a pair of leads, a storage battery connected between said leads, a third lead, one of said pair of leads and said third lead being adapted for connection with a load, two groups of storage batteries, each group including a plurality of storage batteries of a smaller voltage capacity than said first-mentioned battery and a limiting resistance in the circuit of each of said smaller voltage capacity batteries, and means for alternately connecting the batteries of one group in parallel between said pairs of leads with the limiting resistance thereof in said circuit and simultaneously connecting the batteries of the other group in series between said third lead and one of said pair of leads.

13. A voltage modifying system comprising, in combination, a plurality of units each comprising a pair of contacts, an electrical storage battery connected between said pair, a second pair of contacts oppositely disposed with respect to the first pair, an electrical storage battery connected between said second pair, a vibrating contact operating between two opposed contacts of said first and second pair and connected to one side of a source of supply, a vibrating contact operating between the other two opposed contacts of said first and second pair and connected to another side of a source of supply, a third pair of contacts oppositely disposed to said first pair and having said first-mentioned electrical storage battery connected therebetween, a fourth pair of contacts oppositely disposed relatively to said second pair of contacts and having said second electrical storage battery connected therebetween, a vibrating contact operating between two opposed contacts of said third and fourth mentioned pair and adapted for connection to the load, and another vibrating contact operating between the other contacts of said third and fourth pair and connected to a vibrating contact of the next succeeding unit which corresponds to said third mentioned vibrating contact and the vibrating contact of the last unit corresponding to the fourth mentioned vibrating contact being adapted for connection to the load.

14. A voltage modifying system comprising, in combination, a plurality of units each comprising a pair of contacts, an electrical storage unit connected between said pair, a second pair of contacts oppositely disposed with respect to the first pair, an electrical storage unit connected between said second pair, a vibrating contact operating between two opposed contacts of said first and second pair and connected to one side of a source of supply, a vibrating contact operating between the other two opposed contacts of said first and second pair and connected to another side of a source of supply, a third pair of contacts oppositely disposed to said first pair and having said first-mentioned electrical storage unit connected therebetween, a fourth pair of contacts oppositely disposed relatively to said second pair of contacts and having said second electrical storage unit connected therebetween, a vibrating contact operating between two opposed contacts of said third and fourth mentioned pair and adapted for connection to the load, and another vibrating contact operating between the other contacts of said third and fourth pair and connected to a vibrating contact of the next succeeding unit which corresponds to said third mentioned vibrating contact and the vibrating contact of the last unit corresponding to the fourth mentioned vibrating contact being adapted for connection to the load.

WILLIAM W. GARSTANG.